(12) United States Patent
Dunn

(10) Patent No.: US 11,908,475 B1
(45) Date of Patent: Feb. 20, 2024

(54) SYSTEMS, METHODS AND NON-TRANSITORY COMPUTER READABLE MEDIA FOR HUMAN INTERFACE DEVICE ACCESSIBILITY

(71) Applicant: Cephable Inc., Wilmington, MA (US)

(72) Inventor: Alexander Dunn, Wilmington, MA (US)

(73) Assignee: CEPHABLE INC., Wilmington, MA (US)

( * ) Notice: Subject to any disclaimer, the term of this patent is extended or adjusted under 35 U.S.C. 154(b) by 0 days.

(21) Appl. No.: 18/167,158

(22) Filed: Feb. 10, 2023

(51) Int. Cl.
- *G10L 15/22* (2006.01)
- *G10L 15/187* (2013.01)
- *G10L 15/25* (2013.01)
- *G10L 15/08* (2006.01)

(52) U.S. Cl.
CPC ............ *G10L 15/22* (2013.01); *G10L 15/187* (2013.01); *G10L 15/25* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,699,456 | A * | 12/1997 | Brown | G06V 30/347 704/E15.022 |
| 10,885,918 | B2 * | 1/2021 | Hsu | G10L 15/26 |
| 10,958,457 | B1 * | 3/2021 | Davis | H04L 12/2803 |
| 2014/0039898 | A1 * | 2/2014 | Reich | G10L 15/22 704/E21.001 |
| 2014/0278441 | A1 * | 9/2014 | Ton | G06F 3/017 704/275 |
| 2019/0102482 | A1 * | 4/2019 | Ni | G10L 15/18 |
| 2019/0295541 | A1 * | 9/2019 | Pelton | G10L 15/26 |
| 2020/0098384 | A1 * | 3/2020 | Nematihosseinabadi | A61B 5/4803 |
| 2020/0104362 | A1 * | 4/2020 | Yang | G06N 5/048 |
| 2020/0194004 | A1 * | 6/2020 | Bates | H04L 67/125 |
| 2021/0050018 | A1 * | 2/2021 | Kim | G10L 15/183 |
| 2021/0264916 | A1 * | 8/2021 | Kim | G10L 15/22 |
| 2022/0101830 | A1 * | 3/2022 | Freed | G10L 15/065 |
| 2022/0189469 | A1 * | 6/2022 | Carbune | G10L 15/285 |

* cited by examiner

*Primary Examiner* — Jonathan C Kim
(74) *Attorney, Agent, or Firm* — Reed Smith LLP

(57) ABSTRACT

A method, system, and non-transitory computer readable media for converting input from a user into a human interface device (HID) output to cause a corresponding action at an mapped device includes receiving one or more user input from a user at an input device, analyzing the user input selecting a command from a command profile that maps at least one of the received user inputs to one or more mapped tasks, executing the one or more mapped tasks associated with the selected command, and causing one or more corresponding actions at one or more mapped devices associated with the one or more mapped tasks.

16 Claims, 10 Drawing Sheets

SYSTEMS, METHODS AND NON-TRANSITORY COMPUTER READABLE MEDIA FOR HUMAN INTERFACE DEVICE ACCESSIBILITY

BACKGROUND

A human interface device (HID) is a device class that can take input from a user and can generate an output to a user at the same HID device that received the input or at another device.

Prior to the introduction of the HID concept, devices usually conformed to strictly defined protocols for mouse, keyboards and joysticks; for example, the standard mouse protocol prior to the HID concept supported relative X- and Y-axis data and binary input for up to two buttons, with no legacy support.

In contrast, HID-defined devices deliver self-describing packages that contain any number of data types and formats. A single HID driver on a computer can parse data and enable dynamic association of data input and output (I/O) with application functionality, which has enabled rapid innovation and development, and prolific diversification of new human-interface devices.

In HID protocol, there are two primary entities: the device and the host. The device is the entity that directly interacts with a user, such as a keyboard or mouse. The host communicates with the device and receives input data from the device on input performed by the user. Output data flows from the host to the device and then to the user. Common examples of a host include a computer, gaming system, cell phone, or other computing device capable of receiving input from a user and generating an output to that user, whether occurring on the HID itself or on another computing device.

Common input from a user that HIDs convert into digital output at a computing device includes keystrokes, button pressing, and joystick movement. These common HID inputs require a physical activation, such as moving a mouse or pressing a key, that are often less accessible to people with dexterity challenges, such as people with cerebral palsy, and are limited in their speed by the user's ability to move with a single movement at a time. There is, therefore, a need for methods and systems to expand accessibility to HIDs in which non-traditional HID inputs can be defined and processed to generate the same HID outputs as traditional HID inputs.

BRIEF DESCRIPTION OF THE DRAWINGS

Example embodiments in accordance with this disclosure will now be described with reference to the attached figures.

DETAILED DESCRIPTION

Applicant has developed methods, systems, and computer-readable media that aim to convert a user input into an output that overcome the aforementioned drawbacks of known HIDs. In particular, Applicant has developed methods, systems, and computer-readable media that use non-traditional HID input, such as speech, body movements, facial gestures, and device tilting/motion, alone or in combination with traditional HID inputs, to generate a HID output and non-HID output and cause a corresponding action at a computing device.

While methods, systems, and computer-readable media are described herein by way of examples and embodiments, those skilled in the art recognize that methods, systems, and computer-readable media for converting user input into output are not limited to the embodiments or drawings described. It will be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the words "may" and "can" are used in a permissive sense (i.e., meaning having the potential to) rather than the mandatory sense (i.e., meaning must). Similarly, the words "include," "including," and "includes" mean including, but not limited to.

Figure 1:
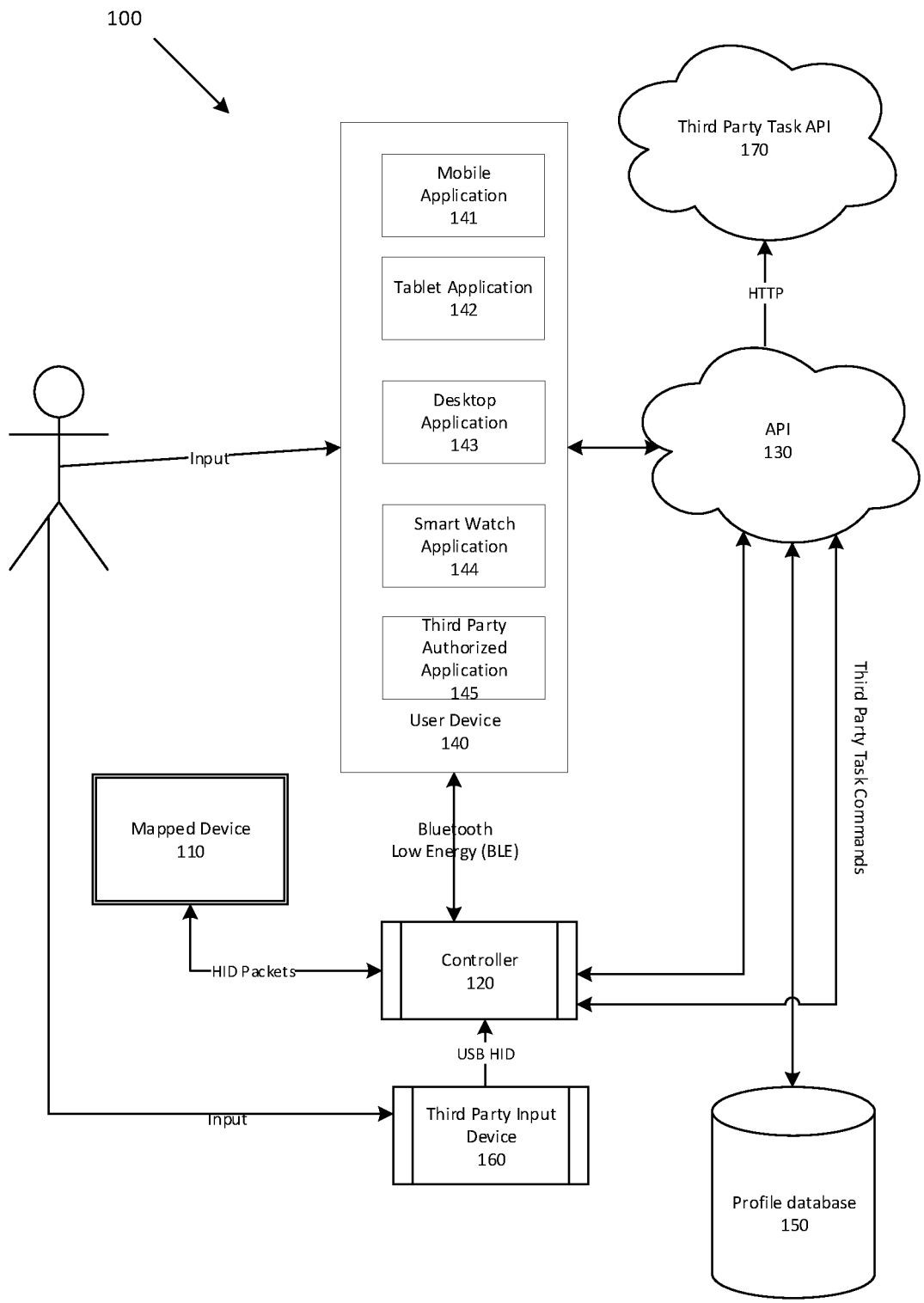
FIG. 1 is an exemplary embodiment of a system for converting user input into a corresponding mapped task according to this disclosure.

FIG. 1 illustrates a system 100 for converting user input into a mapped output according to an exemplary embodiment. FIG. 1 can include one or more mapped devices 110, a controller 120, an application programming interface (API) 130, a user device 140 running a client application, e.g., mobile application 141, tablet application 142, desktop application 143, smart watch application 144, and third party authorized application 145, a profile database 150, one or more third-party input devices 160, and one or more third party task APIs 170.

As used herein, a command defines a mapping between a user input and a mapped task. A user input can include traditional HID inputs, such as keystrokes, button presses, joystick movements, and the like, as well as non-traditional HID inputs, such as speech, which can include words, phrases, and sounds, other sounds such as claps, snaps, or clicks, body movement and gestures, and facial movements and gestures. A mapped task can include a traditional HID input that is associated with a corresponding mapped device and causes a corresponding action at the corresponding mapped device. In this way, a corresponding action can be caused at a mapped device using a traditional or a non-traditional HID input.

A mapped device 110 can be a laptop computer, desktop computer, tablet computer, mobile device, gaming console, or other computing device that can receive a HID report corresponding to an executed mapped task from controller 120 that causes a corresponding action at mapped device 110.

A controller 120 can be a computing device that receives input from user device 140 and/or one or more third-party input devices 160 and executes one or more mapped tasks that cause one or more corresponding actions at a mapped device 110. Controller 120 can be communicatively coupled via, for example but not limited to, Bluetooth low-energy, websockets, HTTP POST and HTTP long-polling, or USB connection, to mapped device 110, API 130, user device 140, and one or more third-party input devices 160.

API 130 can include one or more web servers with HTTP methods and websockets connections that allow for input devices and mapped devices to communicate by sending commands while also allowing users to save configurations and account information in a database, e.g., user and profile database 150.

A user device 140 can include a mobile device such as a smart phone, a tablet computer, a laptop computer, a desktop computer, or any other computing device hosting a client application, e.g., mobile application 141, tablet application 142, desktop application 143, smart watch application 144, and third party authorized application 145. User device 140 can also detect one or more user inputs and communicate the one or more user input to controller 120. User device 140 can also receive a HID report corresponding to an executed mapped task that causes a corresponding action at a client application and/or a third party authorized application 145.

Figure 5:
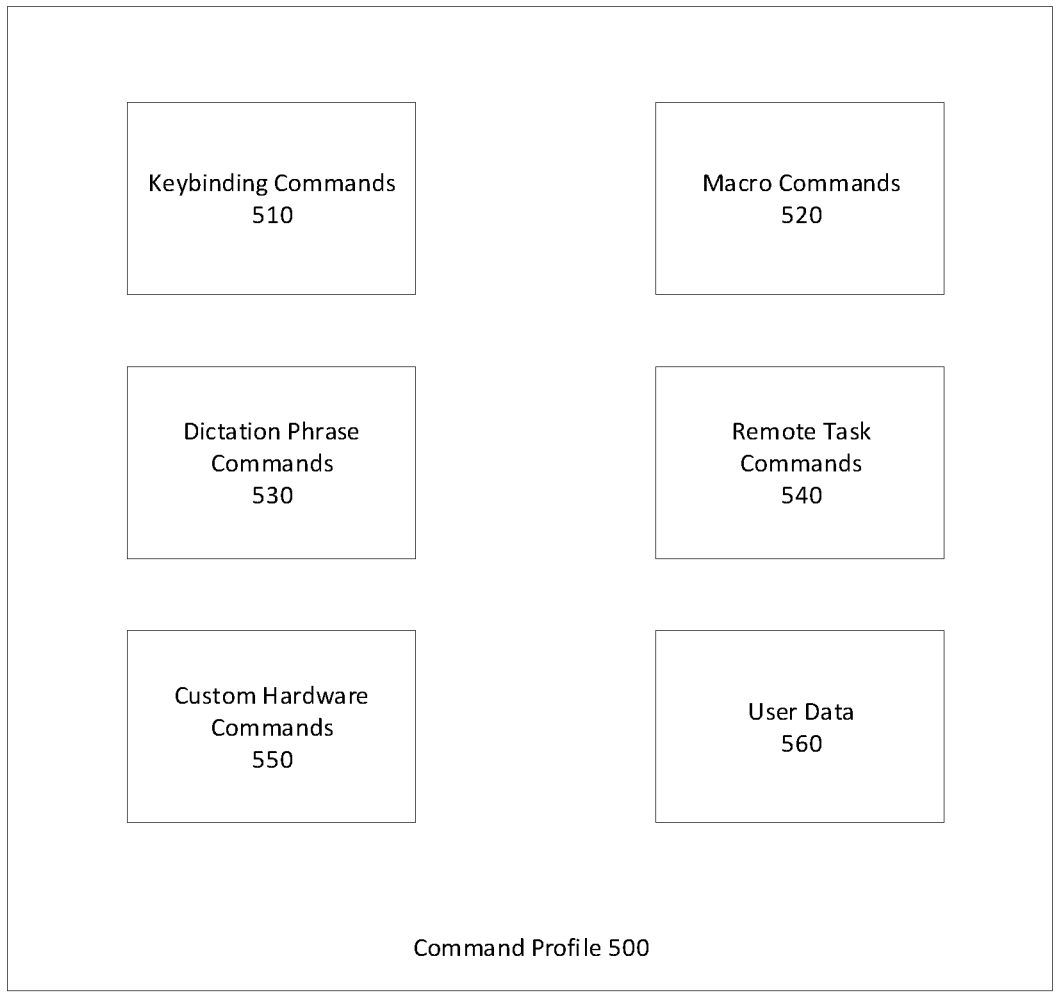
FIG. 5 a command profile according to an exemplary embodiment of this disclosure.

User and profile database 150 can include one or more user profiles, each including one or more command profiles, e.g., command profile 500 in FIG. 5, that describe one or more commands. Each command profile stored in profile database 150 can include a name and a description. The name and description of a command profile reflects a list of programs or systems that one or more commands of the corresponding command profile are associated with. A command profile can be selected by a user.

Alternatively, a command profile can be selected by controller 120 based on user input received by controller 120. For example, controller 120 can communicate with mapped device 110 and identify one or more HID descriptors that are compatible with mapped device 110. Controller 120 can then select a command profile that includes command that are compatible with the one or more HID descriptors of mapped device 210.

Third party task API 170 can include one or more available tasks associated with a third party authorized application 145 and/or a mapped device 110 that allow controller 120 to execute a mapped task and cause a corresponding action at a third party system. User device 140 can query third party task API 170 for available tasks and a user can select from the available tasks in order to define remote task commands, e.g., remote task commands 540 in FIG. 5, in a command profile, e.g., command profile 500 in FIG. 5, associated with the user.

A command profile can be selected automatically using profile switching. In this case, controller 120 can monitor programs running on mapped device 110 and/or on user device 140 via a client application. If controller 120 identifies that a user is running a program or application, and a corresponding command profile associated with that program or application has been defined, then controller 120 can automatically switch to that corresponding command profile associated with that program or application. If no corresponding command profile associated with the program or application has been defined, then controller 120 does not automatically select a command profile and can select a default command profile or continue with a previously selected command profile.

Mapped device 110 and user device 140 can be the same device. If mapped device 110 and user device 140 are the same device, a client application running on the device may detect one or more user inputs of a user that correspond to mapped task at a second program or application running on the device. Alternatively, the client application can be the program that receives a HID report that causes a corresponding action on the client application. In other words, controller 120 can receive one or more user inputs detected by the client application and execute a corresponding mapped task that causes a corresponding action at the client application.

Figure 2:
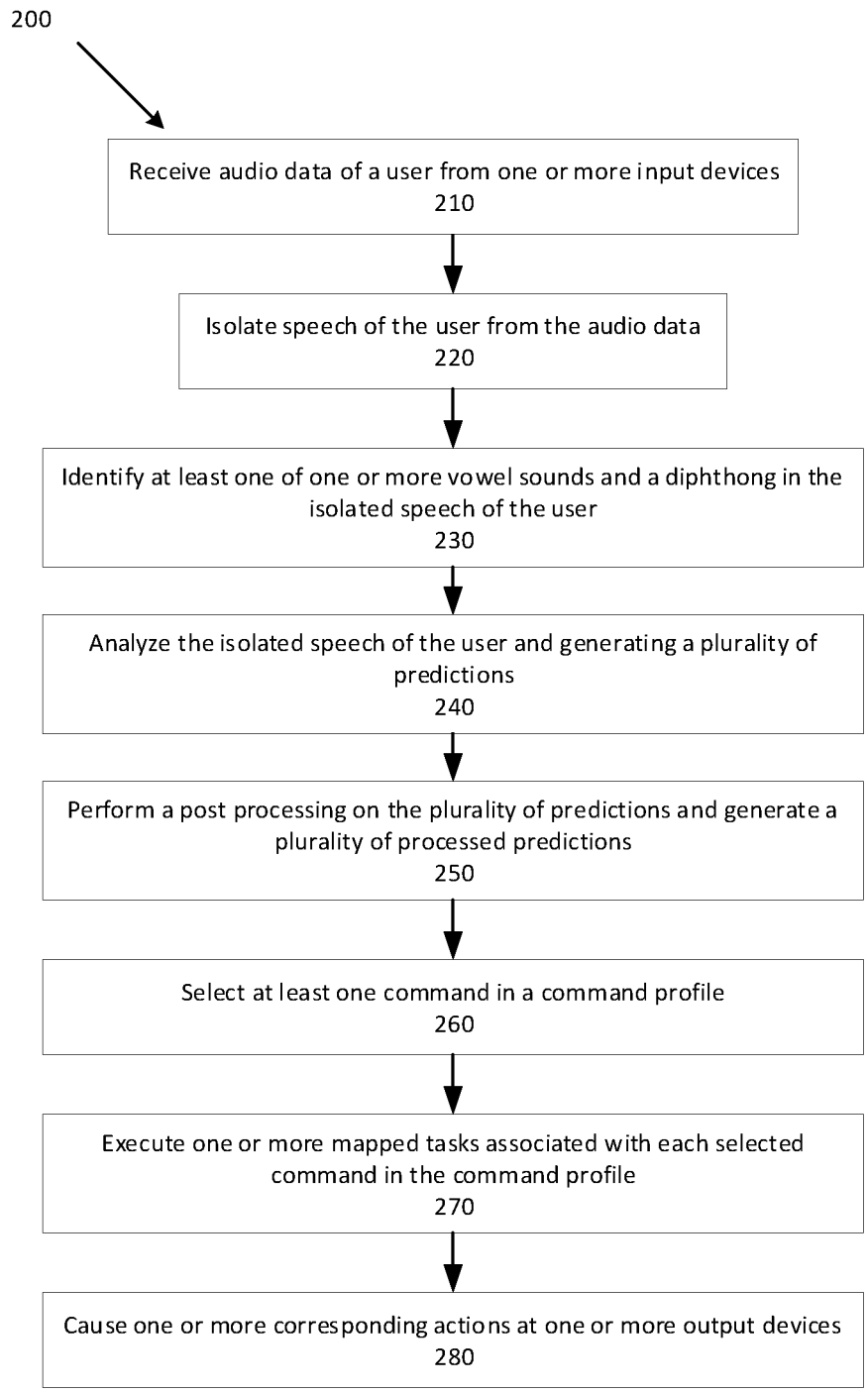
FIG. 2 is a flow chart of an exemplary embodiment of a method for converting speech input of a user into a mapped task and causing a corresponding action at a mapped device.

FIG. 2 illustrates a flowchart of a method 200 for converting speech input of a user into a mapped task and causing a corresponding action at a mapped device according to an exemplary embodiment.

At step 210, audio data of a user is received. Receiving audio data of a user can include a controller, e.g., a controller 120, receiving audio data from an input device, e.g., a user device 140, a third-party input device 160, corresponding to speech of a user detected by at least one microphone associated with the input device. Alternatively, controller 120 can be equipped with at least one microphone and act as an input device that detects speech input.

At step 220, controller 120 isolates the speech of the user. The audio data received by controller 120 can include other audio in addition to the speech of the user, such as speech from other persons near each microphone and other background noise. In order to identify the speech of the user, it is important to filter out excess noise that does not correspond to the speech of the user and is therefore not reflective of the speech input provided to the at least one microphone. This helps improve the accuracy of processing speech input in order to correctly select one or more commands from the command profile at step 260 in method 200. Over time, controller 120 can compare current audio data with previously received audio data for which the speech of the user has been isolated to improve the quality and accuracy of isolating the speech of the user.

Isolating 220 the speech of the user can include controller 120 performing audio coning on the audio data received to identify the speech of the user in the audio data by inspecting the audio data from a first microphone and the audio data from an Nth microphone to detect characteristics of each audio data, including volume, clarity, and consistency. Controller 120 compares these characteristics to other audio sources in the audio data to determine which audio corresponds to the speech of the user, taking into account, for example, a distance that an audio source is from each microphone from which audio data is received, a direction an audio source is facing relative to each microphone, and other data regarding a spatial positioning of an audio source.

Isolating the speech of the user can include controller 120 merging the audio data from the first microphone with the audio data of the Nth microphone into a single channel mono-audio buffer and then duplicating the single channel mono-audio buffer into two single channel mono-audio buffers. In embodiments in which controller 120 receives audio data from a single microphone, controller 120 may omit merging the audio data.

At step 230, controller 120 identifies at least one of one or more vowel sounds and a diphthong in the isolated speech of the user. This can include controller 120 applying a vowel-sound detection analysis to isolated speech of the user to detect vowel sounds and diphthongs. The vowel-sound detection analysis applies a machine-learning model trained with audio data and labelling of fifteen different vowels and diphthongs that represent different mouth positions and positions of the tongue. Controller 120 applies this model to the isolated speech of the user to identify discrete vowel sounds and diphthongs. Controller 120 can detect characteristics of vowel sounds, such as whether the vowel sounds is rounded or unrounded, whether the vowel sounds correspond to a position of a tongue of the user at a front, near front, central, near back, or back of the mouth, and whether the mouth of the user is open, near open, open mid, mid, closed mid, near closed, or closed. During the vowel-sounds detection analysis, controller 120 cross-references each discrete vowel sound and diphthongs detected with a command profile, and if one or more commands mapping a user input corresponding to a vowel sound or diphthong to a mapped task is identified, then controller 120 can select 260 the one or more commands.

At step 240, controller 120 analyzes the isolated speech of the user using a speech recognition model and generates a plurality of predictions. Controller 120 can generate a partial prediction for the isolated speech of the user at a user-determined frequency, e.g., every 0.02 s. For example, if the audio data corresponds to a user saying the phrase "jump over the hurdle," controller 120 can generate a partial prediction every 0.02 s for that phrase over the total time it takes to complete the phrase. Controller 120 can thus generate partial predictions corresponding to a word or phrase every 0.02 seconds, which can result in predictions such as "jump," then "jump oh," then "jump ove," then "jump over," then "jump over the," then "jump over the her," then "jump over the hurt," and finally "jump over the hurdle." Controller 120 can generate a final prediction when there is a period of non-speech audio in the isolated speech of the user for a user-determined time, such as 250 ms. By providing user-determined frequencies for predictions and of non-speech audio, the speech recognition model and thus can be customized to specific needs of a user, such as a user with an irregular speech pattern that, for example, require more time to complete uttering a word, sound, or phrase that is defined as a user input in a command.

At step 250, controller 120 performs a post processing on each partial prediction of the plurality of partial predictions and the final prediction to generate one or more processed predictions. Performing a post processing can include applying a post-processing algorithm to each partial prediction of the plurality of partial predictions and the final prediction. Controller 120 can then detect 260 a command based on the one or more processed predictions, where each processed prediction can correspond to a partial prediction of the plurality of partial predictions, the final prediction, or a modified prediction, where a modified prediction represents a partial prediction or a final prediction that has been modified by controller 120 as a result of the post processing.

Figure 3:
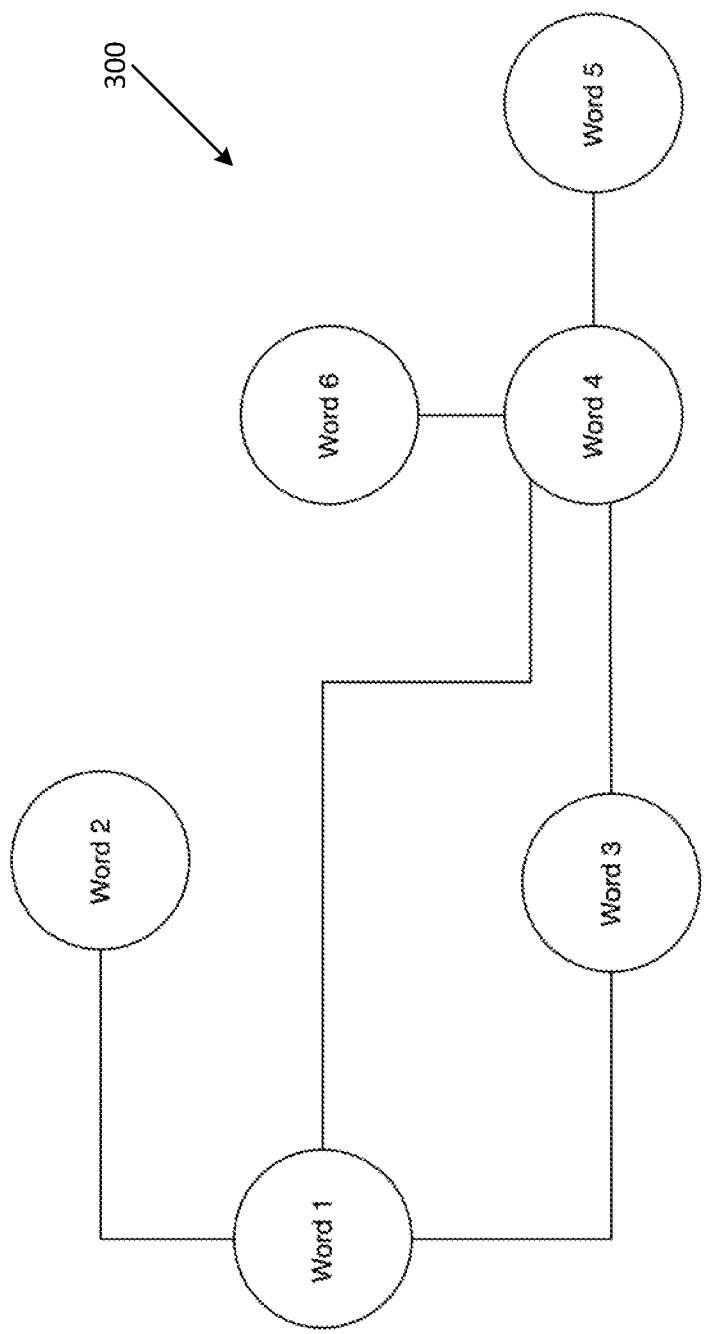
FIG. 3 is word graph according to an exemplary embodiment.

Performing 250 a post processing can include comparing each word and phrase in each partial prediction of the plurality of partial predictions and each word and phrase in the final prediction to one or more relative words and phrases in a personalized word graph to generate a processed prediction. As illustrated in FIG. 3, a personalized word graph 300 can include a plurality of word-phrase nodes, e.g., Word 1, Word 2, Word 3, Word 4, Word 5, and Word 6, and a plurality of edges that connect each of the plurality of word-phrase nodes. Each word-phrase node corresponds to a word or phrase that is phonetically similar to a word or phrase of a given partial or final prediction being processed. A word-phrase node can include a phonetic representation, one or more phonetic components, a syllable count, a written representation of a word or phrase, a weighting value, a session frequency, a total frequency, and an average frequency gap. Each edge of a plurality of edges can include a phonetic structure distance, which reflects a number of phonetic parts shared by a pair of nodes connected by each corresponding edge, and a number of transitions. While illustrated as including Word 1 through Word 6, each personalized graph, e.g., 300 and 400, can include as many as hundreds of thousands of millions of word-phrase nodes, which can vary in quantity based on the language of speech of the user and the length of each partial and final prediction being processed. In other words, longer and more complex partial and final predictions will have larger and more complex personalized graphs, while simple single word partial and final predictions will have smaller and less complex personalized graphs.

Personalized word graph 300 can be stored on user device 140. Personalized word graph 300 can additionally or alternatively be stored on API 130 and can be shared with other user devices.

In some embodiments, controller 120 can generate a processed prediction by applying a post processing algorithm to each word-phrase node corresponding to each word or phrase from the plurality of partial predictions and the final prediction in personalized word graph 300. Each word-phrase node representing a word or phrase from a partial prediction or the final prediction can be referred to as a landing word. Applying a post processing algorithm can include controller 120 applying a correction formula to calculate a correction score according to the following:

$$\frac{RW - D}{LW - D} + \frac{T}{F} \geq H,$$

where F is a total frequency of a landing word referring to how many times the landing word has been detected in previous iterations of post processing, D is a phonetic distance between the landing word and a relative word where phonetic distance is a number of differences between two word phrase nodes of phonetic characters (e.g., "cat" and "cap" with the phonetic character arrays of ['k', 'a','T'] and ['k', 'a', 'p'], respectively, have a phonetic difference of 1), T is a number of transitions made, which describes each time a transition or replacement from one word or phrase to another is made in subsequent processes, LW is a weight of the landing word, RW is a weight of a relative word and H is a required threshold correction value. Thus, if threshold correction value H is exceeded by the correction score (represented by the left hand side of the formula), then controller 120 generates a processed prediction that corresponds to the relative word and not the landing word. In other words, controller 120 generates a processed prediction that is a corrected prediction, different from the landing word of the partial prediction or final prediction being processed. If the threshold correction value H is not exceeded, then controller 120 generates a processed prediction that corresponds to the landing word of the partial prediction or the final prediction being processed. In other words, controller 120 does not make a correction and generates a processed prediction identical to the landing word of the partial prediction or the final prediction being processed.

A user may adjust a threshold correction value H between 0 and 100. A user can similarly adjust a weight of a landing word LW and a weight of a relative word RW. For full corrections, in which controller 120 will always generate a processed prediction that is a corrected prediction different from the landing word, a threshold correction value H of 0 can be defined, and a weight RW of each relative word can be 100. For no corrections, in which controller 120 will always generate a processed prediction that is identical to the landing word, a weight RW of each relative word can be set to zero and a threshold correction value H can be set to 100. Thus, values in between full corrections and no corrections can act as a sliding scale of how corrective controller 120 can be. This allows a user to customize the command detection to account for disabilities affecting speech of the user.

It will be appreciated by a person of ordinary skill in the art that the correction formula described herein is merely a single example of a correction formula and that alternative correction formulas may be applied without departing from the scope of this disclosure.

Figure 4:
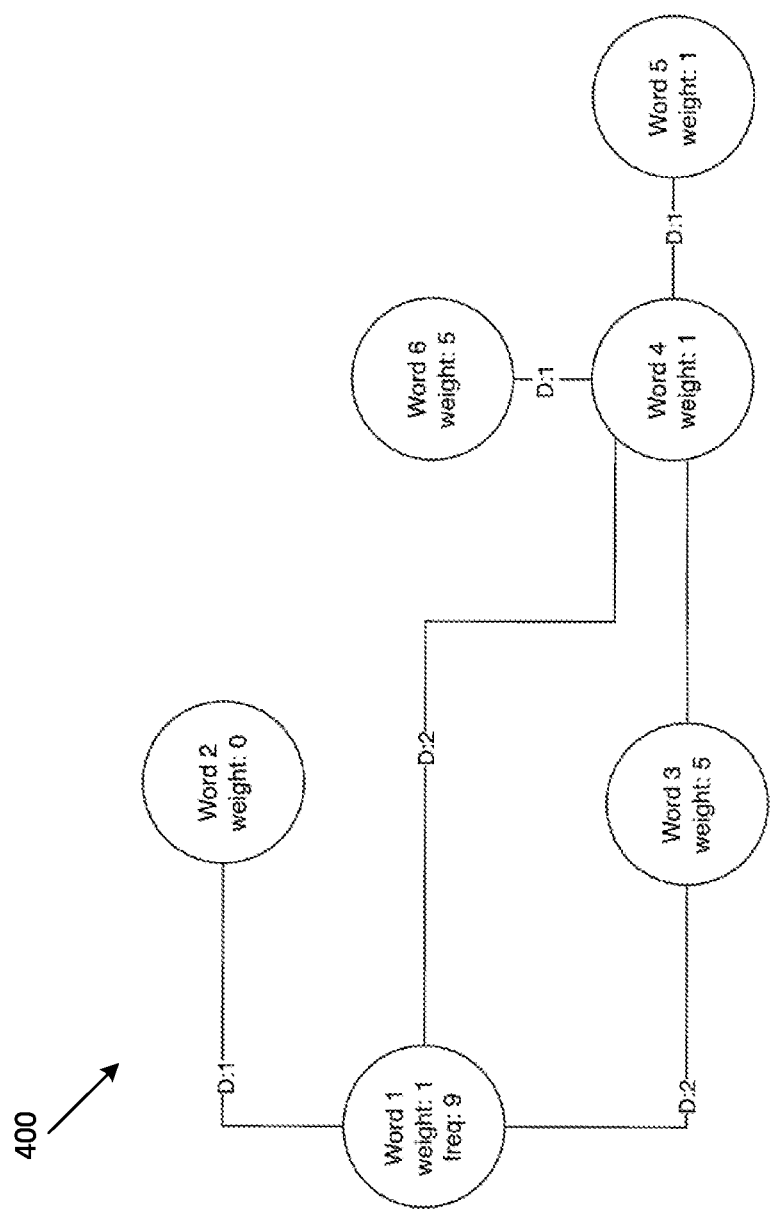
FIG. 4 is a detailed view of a word graph according to an exemplary embodiment.

For example, as illustrated in FIG. 4, a personalized word graph 400 can include Word 1, Word 2, Word 3, Word 4, Word 5, and Word 6. In this exemplary embodiment, controller 120 Word 1 is a landing word, where Word 1 corresponds to a word or phrase from a prediction, including a partial prediction or a final prediction. Word 1 includes a weight of one, corresponding to the weight LW of the landing word, and a total frequency requirement F of 10. Word 2 through Word 6 each correspond to a relative word that is phonetically similar to the landing word, Word 1. Each relative word includes a weight RW reflecting a configured weight of a relative word in word graph 400 that is compared to weight LW of the landing word. Each edge includes a phonetic distance between word nodes connected by that edge, represented by D:1 or D:2, where D:1 represents a phonetic distance of 1 and D:2 represents a phonetic distance of 2. A person of ordinary skill in the art will appreciate that the weights and phonetic distances provided in FIG. 4 are merely exemplary and do not limit the weights and phonetic distances that can be associated with any given word node or edge, respectively.

Optionally, performing a post processing can include controller 120 analyzing the final prediction to determine whether the final prediction begins with a dictation phrase defined in a command profile. If the final prediction begin with a dictation phrase, such as "type," and the command profile includes one or more dictation phrases commands 530 defining a command with the corresponding dictation phrase, then controller 120 can select 260 the one or more dictation phrase commands.

At step 260, controller 120 selects one or more commands in a command profile corresponding to a user input mapped to a mapped task based on the detected vowels and diphthongs identified at step 230 and/or the one or more processed predictions generated at step 250. Selecting one or more commands in a command profile can include controller 120 parsing a database, e.g., profile database 150, and identifying a command profile having a profile data structure defining one or more commands that maps a user input matching a detected vowels and diphthongs identified at step 230 and/or the one or more processed predictions generated at step 250. Alternatively, a command profile can be pre-selected by a user. In such cases, controller 120 can parse the pre-selected command profile to identify one or more profile data structures defining one or more commands that maps a user input matching the one or more detected vowels and diphthongs identified at step 230 and/or the one or more processed predictions generated at step 250.

Controller 120 can apply a start of chain with removal prediction mode to select a command that maps a user input matching one or more processed predictions generated at step 250. Start of chain with removal requires that a start of a given prediction contains a user input mapped to a mapped task in the corresponding command profile in order to select the command. When a command is selected, the command is removed from the processed prediction, and controller 120 continues analyzing the processed prediction to detect additional commands. For example, if a command includes a user input corresponding to a speech input of "help" and the corresponding processed prediction generated by controller 120 is "please help me," then controller 120 will not detect the command corresponding to an input of "help" because the processed prediction does not start with the command (i.e., the word "please" comes before the word "help" in the processed prediction). If the command profile also defines a command having a user input corresponding to a speech input of "please," then controller 120 can detect the command for "please" because "please" starts the corresponding processed prediction. Controller 120 can then remove "please" from the processed prediction and continue analyzing the processed prediction. In this case, controller 120 can then also detect the command for "help" because the command begins the prediction being analyzed now that the command "please" was detected and removed from the prediction.

Alternatively, controller 120 can apply a mid-chain with removal mode to select a command from the one or more processed predictions. In mid-chain with removal mode, controller 120 selects a command at any part of the processed prediction, not just the start of the prediction, as start of chain with removal mode requires. For example, using the processed prediction "please help me," controller 120 can analyze the processed prediction and select the command having a user input corresponding to a speech input of "help" even though the word "help" is preceded in the processed prediction by the word "please" and followed by the word "me." Once selected, controller 120 removes the word "help" from the processed prediction and continues to analyze the processed prediction to select additional commands.

In another alternative, controller 120 can apply a mid-chain with no removal mode to select a command from the one or more processed predictions. Like with mid-chain with removal mode, a controller 120 running mid-chain with no removal mode can select a command at any part of the processed prediction. However, controller 120 running mid-chain with no removal will not remove a word from the processed prediction after detecting a command. Using again the processed prediction "please help me," this means that after selecting the command having a user input corresponding to a speech input of "help," controller 120 will again analyze the full processed prediction without removing the word "help," meaning that it can also select a command having a user input corresponding to a speech input of "help me" and/or "please help."

FIG. 5 illustrates an exemplary embodiment of a command profile 500. Command profile 500 can include one or more profile data structures that define one or more commands that map a user input to a mapped task that causes a corresponding action at a mapped device, e.g., mapped device 110. The one or more profile data structures can include, but are not limited to, keybinding commands 510, macro commands 520, dictation phrase commands 530, remote task commands 540, and custom hardware commands 550. Command profile 500 can further include user data 560 that associate the command profile with a particular use, with one or more mapped devices 110, user devices 140, or programs running thereon. User data 560 can include a name or description of command profile 500 to assist with selection and organization of multiple command profiles. In some embodiments, one or more command profiles are further associated with a user profile that is assigned to a particular user login.

Keybinding commands 510 can include one or more direct mappings between a user input and a mapped task of pressing a single key or button on a HID device, such as a keyboard, mouse, gaming controller, or the like. A user input can include, but is not limited to, speech from a user, a facial expression or gesture of a user, and a body movement or gesture of a user. A corresponding key can include, but is not limited to, a key on a keyboard for any given language configuration, e.g., English, Arabic, Chinese, a button on a mouse, or a button or joystick on a gaming controller or gaming pad.

Macro commands 520 can include one or more commands mapping a user input to a series or combination of mapped tasks. Macro commands 520 can include compound mapped tasks, whereas keybinding commands 510 include singular mapped tasks. In this way, macro output commands 520 can define complex and compound mapped tasks, which can be referred to as macro events, having a plurality of mapped tasks, and can include one or more remote tasks associated with a third-party output task. Macro events can be run in sequence, in parallel, or in any combination thereof. Each macro event can include different properties that describe how the macro event behaves. A macro event can include a plurality of mapped tasks, including but not limited to, key strokes, mouse movements, joystick movements, pauses, and typing.

A key stroke mapped task can include one or more keys or buttons to be pressed on a HID device, such as a keyboard, a mouse, a gaming controller, or a gaming pad, associated with a mapped device that causes a corresponding action at the mapped device, at the same time or in sequence, and an amount of time to hold the key or button in a pressed position. A mouse move mapped task can include a number of pixels to move a mouse cursor left or right and up or down on a corresponding mapped device. A joystick move mapped task can include a percentage displacement left or right and up or down of a joystick and an amount of time to hold the corresponding joystick at the percentage displacement. A pause mapped task can include an amount of time to wait before executing a corresponding action at a mapped device. A typing mapped task can include one or more words or phrases to be typed at a mapped device.

Dictation phrase commands 530 can include commands that include a spoken word or phrase that, when received as a user input, map to a mapped task of performing that word or phrase for a remainder of the user input. For example, a dictation phrase can include a spoken user input of "type" mapped to a mapped task in which the remaining speech of the user in the received user input coming after "type" is typed at a corresponding mapped device.

Remote task commands 540 can include one or more commands mapping a user input to an associated third-party output task. Remote tasks can therefore define commands in which a mapped task causes a corresponding action at a non-HID third party device or application, such as a smart home, backend integrations, or scheduled tasks. Remote task commands can map a user input to a mapped task corresponding to a task on the list of available tasks for third party task API 170. In some embodiments, remote task commands 540 can store a third party access token used by controller 120 to execute the corresponding mapped task against third party task API 170.

Custom hardware commands 550 can include one or more commands mapping a user input at a third-party input device 160 to a mapped task at a mapped device 110. Custom hardware commands 550 allow a user to map a user input at a third-party input device 160 to a different mapped task. For example, if third-party input device 160 is a standard keyboard, custom hardware commands 550 can define a command in which a user input from the keyboard, such as selecting one or more arrow keys on the keyboard, is mapped to a different mapped task casing a corresponding action at mapped device 110. This enables users to re-define the mapped task from what the traditional or default mapped task is for a given input. Custom hardware commands 550 can, for example, include a command defining a user input of selecting an arrow key to a corresponding mapped tasks of moving a mouse cursor on a display screen at mapped device 110. Custom hardware commands 550 can include macro event mappings as well, in which a user input at third-party input device 160 is mapped to one or more mapped tasks, allowing a user to define complex mappings, such as opening a web browser with a single key stroke on a keyboard, or saving a game with a single button press on a gaming controller.

Figure 6:
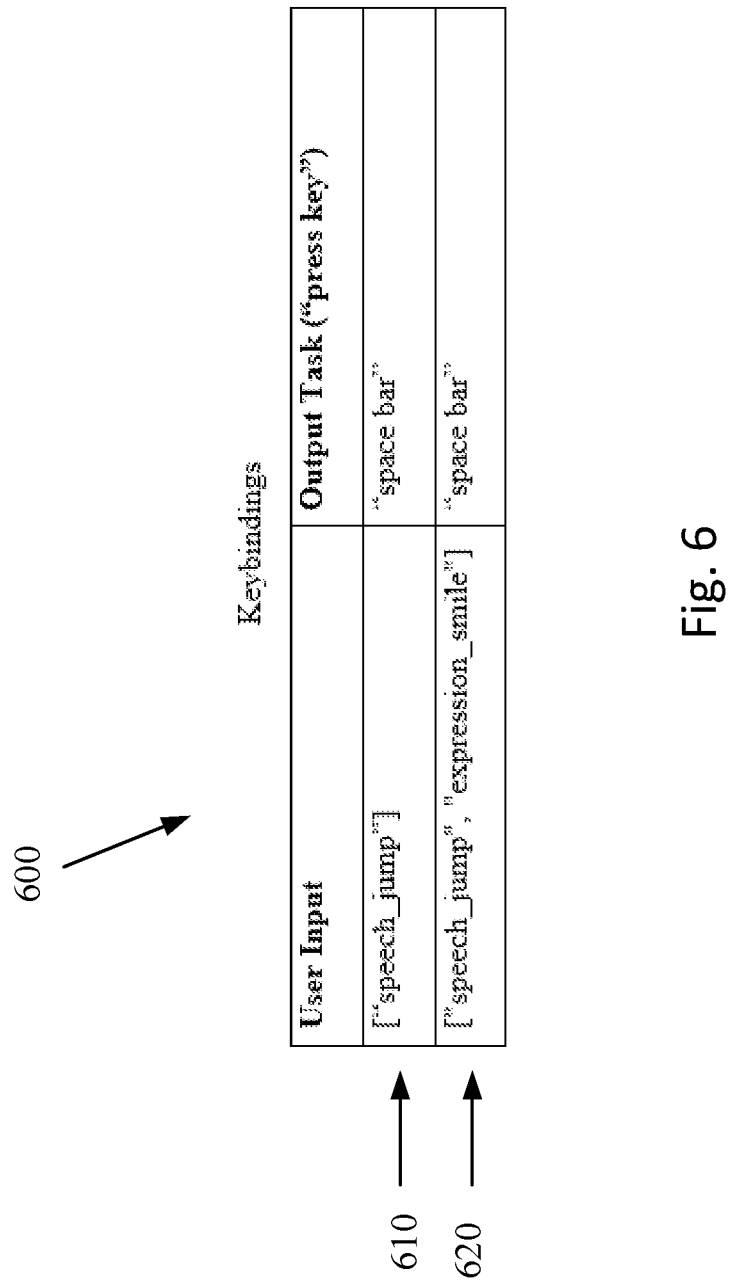
FIG. 6 illustrates an exemplary embodiment of a profile data structure according to this disclosure.

FIG. 6 illustrates an exemplary embodiment of a profile data structure 600. Profile data structure 600 can correspond to a keybinding table containing one or more user inputs mapped to a key (i.e., a mapped task). For example, a command 610 includes a user input of ["speech_jump"] and a mapped task of "space bar" corresponding to a space bar key on a standard keyboard. Thus, when a user says "jump," controller 120 can execute the mapped task that causes the keyboard to register that the space bar has been pressed and cause a corresponding action at a mapped device, e.g., mapped device 110. As another example, a command 620 can include a user input of ["speech_jump", "expression_smile"] and a mapped task of "space bar." Thus, when a user says "jump" or a user smiles, controller 120 can execute the mapped task that causes the keyboard to register that the space bar has been pressed and cause a corresponding action at the mapped device.

While presented herein as a profile data structure corresponding to a keybinding, a person of ordinary skill in the art will appreciate that profile data structure 600 is merely illustrative and that a different profile data structure, such as a profile data structure corresponding to macro commands 520 or custom hardware commands 550, can be similarly described with a user input mapped to a corresponding mapped task that causes an action at a mapped device.

Returning to FIG. 2, at step 270, one or more mapped tasks associated with the one or more selected commands is executed. Each mapped task associated with each selected command defines an input that causes a corresponding action at a mapped device 110 and can include metadata for that action. This metadata can include a length of time to hold a particular, such as pressing a key for 50 ms or moving a mouse 100 pixels in the x-direction and 100 pixels in the y-direction. For commands in which more than one mapped task is defined, metadata can also indicate whether to execute the mapped tasks in sequence or in parallel.

At step 280, controller 120 causes a corresponding action at one or more mapped devices. Causing a corresponding action at one or more mapped devices can include controller 120 communicating one or more HID reports corresponding to the one or more mapped tasks executed by controller 120 to a mapped device 110 that cause a corresponding action at mapped device 110. The corresponding action can reflect the mapped task defined in the command selected in step 120, such as moving a mouse cursor on a computer screen, typing text on a word processing application, or opening and closing an application on mapped device 110. The corresponding action can also include actions executed in a gaming system, such as moving a gaming character, jumping, or performing some other action within a game associated with mapped device 110.

Optionally, after controller 120 isolates the speech of the user at step 230, controller can duplicate the isolated speech of the user into a first channel of isolated speech of the user and a second channel of isolated speech of the user. In this case, controller can identify execute step 230 on the first channel of isolated speech to identify at least one vowel sound and a diphthong and execute steps 240 and 250 on the second channel of isolated speech. Controller 120 can execute these steps in sequence or in parallel.

Figure 7:
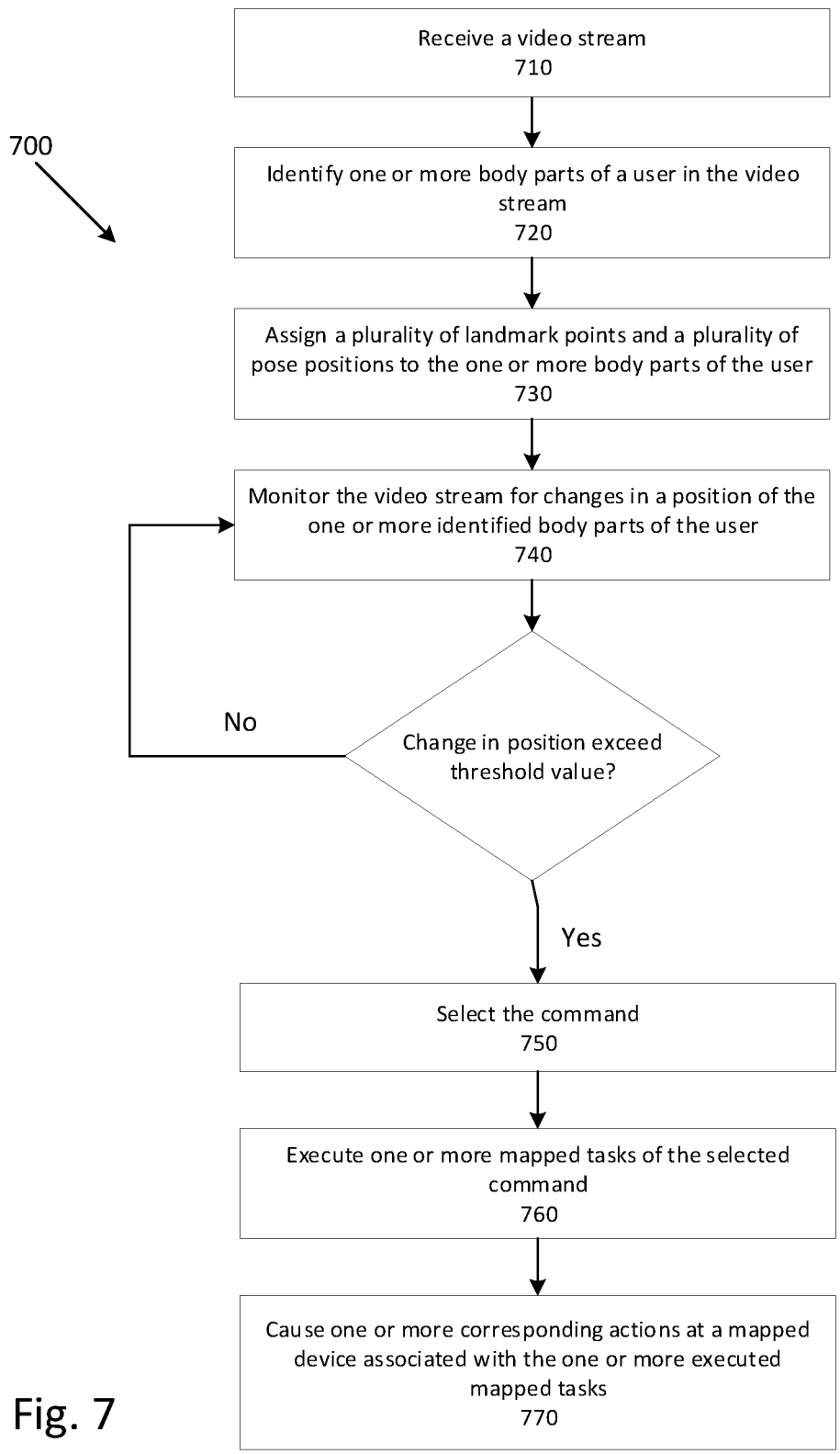
FIG. 7 illustrates a flow chart of an exemplary embodiment of a method for converting facial gesture and body movement input of a user into a mapped task according to an exemplary embodiment of this disclosure.

FIG. 7 illustrates a flow chart of an exemplary embodiment of a method 700 for converting movement input of a user into a mapped task and causing a corresponding action at a mapped device. Controller 120 analyzes one or more user inputs corresponding to facial movement and/or body movement input (collectively referred to as "movement input") received by controller 120 to determine whether a command in a command profile matches the movement input. Controller 120 can identify discrete landmarks and positional information of a face, head, hand, arm, or other body part of a user and analyze changes in the landmarks and positional information, allowing controller 120 to identify position, pitch, roll, and yaw of the user relative to an input device. These changes in the landmarks and position information can be defined as user input mapped to a mapped task in a command in a command profile. By way of non-limiting example, a movement input can include raising or lowering one or both eyebrows of a user, opening, closing, puckering or gritting the mouth of the user, tilting, turning, or leaning a head of the user, raising or lowering one or more fingers of a user, and tilting or turning the entire body of the user. A movement input can further include a temporal requirement in which a corresponding movement of the user is held for a specified period of time. For example, a movement input can include raising or lowering one or both eyebrows of the user for 2 seconds, opening the mouth of the user for 2 seconds, etc.

A command can further be defined by a movement input corresponding to a predetermined position of the body or body part of a user. The predetermined position of the body or body part of the user can include movement inputs corresponding to poses, such as making a fist or raising a hand in which a predetermined distance between one or more landmark points defines a pose. Controller 120 can analyze the movement input and compare distances between landmark points to the predetermined poses. If the difference in distances of the landmark points is within an error range to the distances defined by the predetermined pose, then the corresponding command can be selected and the associated mapped task executed. This error range can be set by a user, allowing for greater or lesser sensitivity of selection that can account for users with disabilities affecting motor functions.

At step 710 of method 700, a video stream corresponding to movement of a user is received. Controller 120 can receive a video stream containing movement data detected by at least one input device, e.g., user device 140, third-party input device 160. The video stream can be detected by a camera of an input device, such as a camera of a mobile device, tablet computer, or desktop or laptop computer. The one or more movement inputs can also be detected by a third party camera, e.g., a third-party input device 160, communicatively coupled to controller 120 or to another input device. The movement data can be a video stream or a data set corresponding to a video stream.

At step 720, one or more body parts of a user is identified. Controller 120 can analyze the video stream to identify a body part, e.g., a face, head, hand, arm, etc., of a user in the video stream. Controller 120 can analyze each frame of the video stream at a frames per second value that is configurable by the user. The frames per second value can be, for example, 30 frames per second. Controller 120 can define a rectangular frame corresponding to a location of the body part within the corresponding frame of the video stream, the location being defined by x and y coordinates corresponding to a width and height, respectively, of the body part. If more than one body part is identified in step 720, then controller 120 can define a rectangular frame corresponding to the location of each body part within the corresponding frame of the video stream. Each rectangular frame can then be copied and cropped to a square frame of the body part that was identified. This square frame containing the copied rectangular frame can be regarded as a baseline frame to which subsequent frames of the video stream are compared to select a command. A user can reset the baseline frame at any time after a body part is identified and an initial baseline frame is defined. In such cases, the method 700 returns to step 720 and controller 120 identifies one or more body parts of a user in the video stream.

Optionally, identifying 720 one or more body parts of a user can include controller 120 comparing each body part to an identification model to determine whether the body part matches a pre-defined body part of a user. If controller 120 identifies a match, then controller 120 can dispose of any other identified body parts that do not match the pre-defined body part. In other words, controller 120 can use the identification model to identify the body parts in the video stream that correspond to a particular user and ignore the body parts in the video stream that do not correspond to the user. This leads to a more accurate selection of a command because the movement input of the user is what is mapped to a mapped task in each command of a command profile. Thus, only movement input from the user is relevant to detecting a command, and all other movement input from other persons or objects in a given video stream is disregarded by controller 120 to reduce the chances of detecting a command based on movement input that does not correspond to the user.

At step 730, a plurality of baseline landmark points and baseline pose positions are assigned to each of the one or more identified body parts of the user. Controller 120 can use a landmark detection model to analyze each identified body part and assign a plurality of baseline landmark points having x and y coordinates relative to the baseline frame. Controller 120 can further use a pose detection model to analyze each identified body part and assign a baseline pose position for a pitch, a roll, and a yaw of the corresponding body party relative to the baseline frame.

At step 740, the video steam is monitored. Monitoring 740 the video stream can include controller 120 monitoring the video stream for changes in a position of one or more landmark points and/or one or more pose points of the one or more identified body parts over a time series of each frame of the video stream to detect a change in position or pose matching a user input defined in a command occurs. Each landmark point maintains a position and identification relative to the other landmark points in each frame, enabling controller 120 to monitor changes in position relative to other landmark points in addition to changes in position relative to the corresponding baseline landmark point. If a command in a command profile is defined with a user input corresponding to movement of the user, and controller 120 determines that a change in position of an identified body part exceeds a threshold value associated with the user input of the command, then controller 120 selects 750 the command and proceeds with executing 130 one or more mapped tasks of the associated command. If controller 120 determines that a change in position of an identified body part does not exceed the threshold value associated with the user input of the command, then controller 120 continues to monitor 740 the video stream for movement that corresponds to a command.

The threshold value associated with a user input of a command can be defined by the user and reflects a sensitivity of controller 120 to movement of the user. Commands having larger threshold values for movement input require a greater change in position of the corresponding body part from baseline landmark points, and commands having smaller threshold values require a lesser change in position of the corresponding body part from baseline landmark points. By allowing a user to adjust the sensitivity of the command detection, a user may customize command detection to account for disabilities that affect the mobility and dexterity of the user.

$$\frac{Dist(SB, SE)}{NW} - \frac{Dist(BB, BE)}{BW} > R; \sqrt{(Ax-Bx)^2 + (Ay-By)^2}$$

For example, if a command is defined as having a user input of "raise left eyebrow," controller 120 monitors the video stream to analyze changes in a position of a left eyebrow of the user relative to position of the left eyebrow in the baseline frame to determine whether to select 750 the command and proceed with executing 760 one or more mapped tasks. The position of each landmark point in a given frame of the video stream is compared with the corresponding baseline landmark points of the baseline frame to determine whether each landmark point has changed position. Controller 120 can determine a distance change along the y-axis of a landmark point corresponding to a central point of the left eyebrow of the user relative to a landmark point corresponding to a highest point of a left eye of the user and a width of the left eye of the user. Controller 120 can apply an algorithm to determine whether the change in position exceeds a threshold value. An exemplary embodiment of the algorithm can include the following:

$$\frac{Dist(SB, SE)}{NW} - \frac{Dist(BB, BE)}{BW} > R; \sqrt{(Ax-Bx)^2 + (Ay-By)^2}$$

where BE is a position of the baseline landmark point of the highest point of the left eye (top center of eye) in the baseline frame, BB is a position of the baseline landmark point of the central point of the left eyebrow in the baseline frame, BW is a position of the baseline landmark point of the width of the left eye in the baseline frame, SE is a position of the landmark point of the highest point of the left eye in a subsequent frame, SB is a position of the landmark point of the central point of the left eyebrow in the subsequent frame, SW is the width of the left eye in the subsequent frame, R is the threshold value required to select a command, and Dist (A,B) is , where Ax and Bx are the x positions and Ay and By are the y positions of a landmark point A and B, respectively.

$$\frac{Dist(SB, SE)}{NW} - \frac{Dist(BB, BE)}{BW} > R; \sqrt{(Ax-Bx)^2 + (Ay-By)^2}$$

Thus, if the distance change of the landmark points of the left eyebrow exceeds threshold value R, then a command having the corresponding movement input of raise left eyebrow is selected. If the distance change of the landmark points of the left eyebrow does not exceed threshold value R, then no command is selected, and controller 120 continues to monitor 740 the video stream to detect a command by determining whether a change in position matching a user input defined in a command occurs.

It will be appreciated by a person of ordinary skill in the art that the algorithm provided above for determining whether a change in eyebrow position exceeds a threshold value can be applied to other body parts of a user without departing from the scope of this disclosure. Applied to a different body part of a user, the algorithm can include a baseline position of one or more landmark points of a body part of the user and a position of the corresponding one or more landmark points of a body part in a subsequent frame to determine whether a change from baseline position exceeds a threshold value. In other words, the algorithm described herein is not limited to determining a change in eyebrow position of a user and can be applied to determine whether a change in position of any body part exceeds a threshold value.

At step 760, one or more mapped tasks associated with the one or more selected commands is executed. The one or more mapped task can be executed by controller 120 in the same way as described with respect to step 270 of method 200 illustrated in FIG. 2.

At step 770, controller 120 causes a corresponding action at one or more mapped devices. Controller 120 can cause a corresponding action at one or more mapped devices in the same way as described with respect to step 280 of method 200 illustrated in FIG. 2.

Figure 8A:
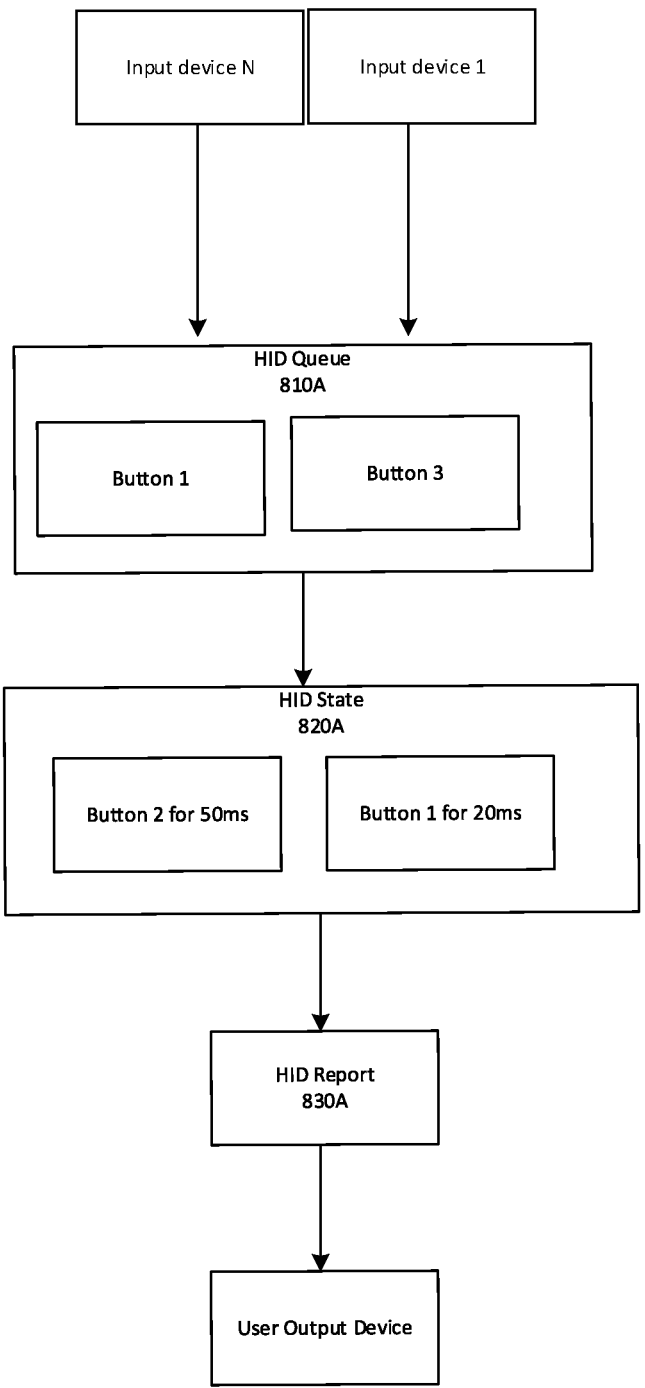
FIGS. 8A and 8B illustrate methods for queuing one or more mapped tasks according to an exemplary embodiment of this disclosure.
Figure 8B:
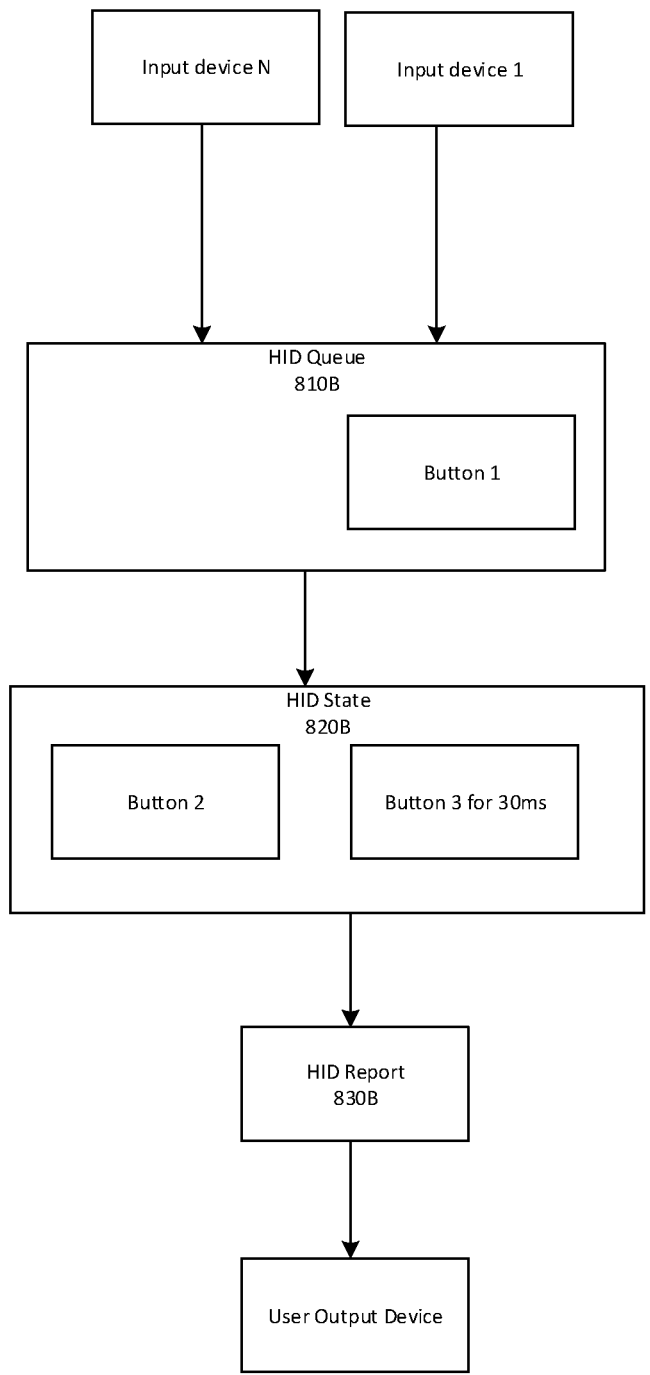

In order to execute multiple mapped tasks in sequence and in parallel, controller 120 can store mapped tasks in a HID state 820A and 820B and a HID queue 810A and 810B of the as illustrated in queuing system 800 in FIGS. 8A and 8B. HID state 820A and 820B reflect mapped tasks that are actively being executed by controller 120, while the HID queue 810A and 810B reflects the mapped tasks yet to be executed by controller 120. When a task is executed, HID packets corresponding to the task are stored in a HID report 830A and 830B, and a task in HID queue 810A and 810B moves to HID state 820A and 820B for execution. The separate branches of queuing system shown in FIGS. 8A and 8B allow controller 120 to run mapped tasks in parallel. Once the one or more mapped tasks of a selected command are executed and stored in HID report 830A and 830B, each HID report is communicated to a corresponding mapped device 110, causing one or more corresponding actions at mapped device 110 that correspond to the HID packets stored in the HID report.

Executing one or more mapped tasks can further include switching a HID descriptor based on the mapped task being executed and stored in a HID report. A HID descriptor describes the type of HID packets that controller 120 stores in a HID report that cause one or more corresponding actions at mapped device 110. For example, a HID descriptor can correspond to a type of HID device, such as a keyboard, a mouse, a gamepad, or any combination thereof. When a task is executed, a HID descriptor corresponding to the type of HID device that the task is being executed on is stored in the HID report. In FIG. 8A, if Button 1 in HID State 820A corresponds to a button on a gamepad, then controller 120 stores a HID descriptor of the gamepad with the corresponding HID packets in HID report 830A. If Button 2 in HID State 820A corresponds to a button on a mouse, then controller 120 can change the HID descriptor from a gamepad-HID descriptor used in connection with the previous task to a HID descriptor of the mouse and store the mouse-HID descriptor in HID report 830A with corresponding HID packets. In this way, controller 120 can communicate a HID report having multiple types of HID packets and cause one or more corresponding actions at a mapped device reflecting output of different HID devices. Controller 120 can automatically change a HID descriptor as described above when it executes a task.

Alternatively and/or additionally, a command profile can be associated with a HID descriptor such that when a command in a command profile is selected, the corresponding HID descriptor is provided to controller 120. Alternatively, controller 120 can receive a request from a mapped device 110 specifying one or more HID descriptors based on limitations of the mapped device 110 that reflect mapped device 110's compatibility with input device 130 and/or third-party input device 160.

Switching HID descriptors allows for improved compatibility with different mapped devices that have restrictions on what descriptors are supported. By recognizing these limitations and storing the appropriate HID descriptor in a HID report, controller 120 is not limited to user inputs that are not compatible with a particular mapped device. In other words, switching HID descriptors allows a user to use a third-party input device 160 that may otherwise be incompatible with a given mapped device 110.

Queuing system 800 can be interrupted if there are conflicting mapped tasks in each HID report 830A and 830B, or between reports 830A and 830B where controller 120 is running mapped tasks in parallel. In such instances, a subsequently executed mapped task overrides a conflicting task that preceded it.

Executing one or more mapped tasks can further include controller 120 executing one or more remote tasks at a third-party distributed system. The one or more remote tasks can be defined in a remote task command 540 profile data structure in a command profile 500. In such embodiments, controller 120 can query API 130 to determine whether a third party access token associated with the one or more remote tasks exists in the command profile. If an access token exists, then API 130 can communicate a task request and the access token to third party task API 170. Third party task API 170 can grant access to API 130, and controller 120 proceeds to cause a corresponding action at one or more mapped devices. In such embodiments, the one or more mapped devices are associated with third party task API 170. This allows users to control third party systems such as smart home or smart vehicle integrated systems, backend integrations, and other scheduled tasks.

Similar to movement input of the user's face or body, controller 120 can receive user input from the input device corresponding to motion of the input device relative to a baseline position of the input device in terms of degrees in roll, pitch, and yaw of the input device and select a command mapping that motion of the input device to a mapped task. Motion of the input device can include, but is not limited to, tilting the input device, turning the input device, shaking the input device, lifting or lowering the input device, or any other pre-defined motion, such as moving the input device in a "figure 8" shape. Motion of an input device can also include movement of a joystick, mouse, or other moveable device or component thereof, as can be the case when an input device is a third-party input device 160, such as a computer mouse or a gaming controller.

Analyzing one or more user inputs corresponding to a motion control can include controller 120 receiving user input from an input device corresponding to motion of the input device. The user input received by controller 120 can correspond to sensor data detected by sensors of the input device, such as motion sensors and accelerometers. If a command defines a user input corresponding to motion of the input device, and the motion relative to the baseline position of the input device exceeds a threshold value defined by the command, then controller 120 can select the command, executing the one or more mapped tasks in the command, and cause a corresponding action at an associated mapped device in the same way as described with respect to methods 200 and 700. The threshold value can be adjusted by the user and reflect the sensitivity of controller 120 to motion of the input device. Greater threshold values require a greater degree of motion from the baseline position of the input device for controller 120 to select the command, and thus can be regarded as less sensitive. Lower threshold values require a lesser degree of motion from the baseline position of the input device for controller 120 to select the command, and thus can be regarded as more sensitive.

Controller can also receive and analyze one or more user inputs corresponding to a third-party input device 160. A third-party input device can include a keyboard, gaming controller, or any other device that receives input from a user and communicates with controller 120. Controller 120 can parse a command profile 500 to determine whether one or more customer hardware commands 550 include a command mapping an input from a third-party input device 160 to a corresponding mapped task at a mapped device 110. If controller 120 identifies a corresponding command, then it can select the command executing the one or more mapped tasks in the command, and cause a corresponding action at an associated mapped device in the same way as described with respect to methods 200 and 700.

Figure 9:
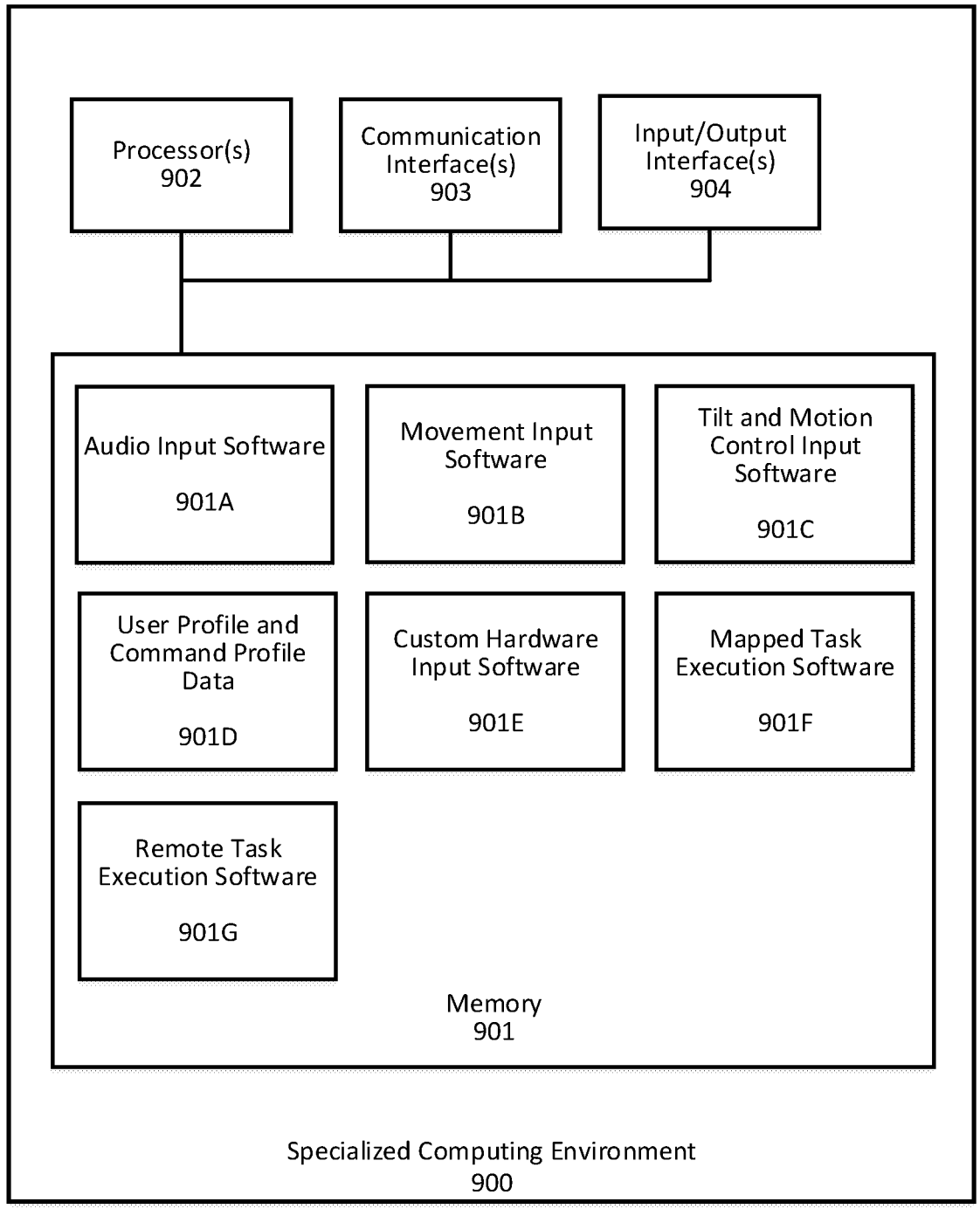
FIG. 9 illustrates the components of a specialized computing environment configured to perform the processes described herein.

FIG. 9 illustrates the components of a specialized computing environment 900 configured to perform the processes described herein. Specialized computing environment 900 is a computing device that includes a memory 901 that is a non-transitory computer-readable medium and can be volatile memory (e.g., registers, cache, RAM), non-volatile memory (e.g., ROM, EEPROM, flash memory, etc.), or some combination of the two. Specialized computing environment 900 can be an application client communicatively coupled with a user device and a mapped device.

As shown in FIG. 9, memory 901 can store audio input software 901A, movement input software 901B, tilt and motion control input software 901C, user profile and command profile data 901D, custom hardware input software 901E, mapped task execution software 901F, and remote task execution software 901G. Each of the software components in memory 901 store specialized instructions and data structures configured to perform the corresponding functionality and techniques described herein.

All of the software stored within memory 901 can be stored as computer-readable instructions, that when executed by one or more processors 902, cause the processors to perform the functionality described with respect to FIGS. 1-8.

Processor(s) 902 execute computer-executable instructions and can be real or virtual processors. In a multi-processing system, multiple processors or multicore processors can be used to execute computer-executable instructions to increase processing power and/or to execute certain software in parallel.

Specialized computing environment 900 additionally includes a communication interface 903, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 900 further includes input and output interfaces 904 that allow users (such as system administrators) to provide input to the system to display information, to edit data stored in memory 901, or to perform other administrative functions.

An interconnection mechanism (shown as a solid line in FIG. 9), such as a bus, controller, or network interconnects the components of the specialized computing environment 900.

Input and output interfaces 904 can be coupled to input and mapped devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 900.

Specialized computing environment 900 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 900.

Applicant has discovered a novel method, system, and computer-readable medium for converting user input into HID output. As explained throughout, the disclosed systems and methods improve accessibility to human-interface devices by supporting a mixed-speech model of vowel sound detection, spoken word detection, and dictation commands. This creates a robust ability to recognize defined commands that include non-traditional spoken commands, enabling accessibility for users who are non-communicative, who have irregular speech patterns, or who have other speech impediments. The disclosed systems and methods also support a managed and situational self-learning speech recognition post processing that lets users adjust thresholds for command detection and adapts to a specific user to account for irregular speech patterns, improving command detection and execution over time.

The disclosed systems and methods also provide a novel approach to recognize facial expressions and body gestures both in an absolute sense and relative to other movement of a user, enabling persons with limited mobility or motor skills to define commands within their abilities that cannot be identified by current HID solutions. The disclosed system and method also allows users and systems to establish a threshold for movement and adjust the sensitivity of the detection to enable more subtle user input.

Further, the disclosed systems and methods provide a novel approach to creating distributed controls of a computer using HID protocols and standards from multiple input devices with both local and remote access, which allows users to control a single computer or system with many different input methods such as voice, face expressions, body gestures, motion tilting, and custom hardware from one or more input devices simultaneously. The disclosed systems and methods allow users to configure and customize what input methods they would like to use and what output HID protocols, remote tasks, or other logic are executed with those inputs.

Having described and illustrated the principles of the invention with reference to the described embodiment, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed:

1. A method comprising:
    receiving, by a computing device, audio data, wherein the audio data comprises speech of a user and other audio;
    isolating, by the computing device, speech of the user from the audio data;
    identifying, by the computing device, at least one of a one or more vowel sound and a diphthong in the isolated speech of the user;
    analyzing, by the computing device, the isolated speech of the user and generating a plurality of predictions, wherein each prediction of the plurality of predictions comprises at least one of a word and a phrase in the isolated speech of the user;
    performing, by the computing device, a post processing on the plurality of predictions and generating a plurality of processed predictions based on the plurality of predictions, wherein performing the post processing on the plurality of predictions and generating a plurality of processed predictions based on the plurality of predictions comprises:
        comparing, by the computing device, at least one word and phrase of the plurality of predictions to one or more relative words and phrases in a word-phrase graph;
        calculating, by the computing device, a correction score for at least one prediction of the plurality of predictions and at least one relative word and phrase of the one or more relative words and phrases;
        determining, by the computing device, whether the correction score exceeds a threshold correction score; and generating, by the computing device, a processed prediction,
  wherein the processed prediction comprises the at least one relative word and phrase used to calculate the correction score if the correction score exceeds the threshold correction score, and
  wherein the processed prediction comprises the at least one prediction used to calculate the correction score if the correction score does not exceed the threshold correction score;
selecting, by the computing device, a first command in a command profile, the first command defining a user input comprising at least one of the vowel sound and the diphthong identified in the isolated speech of the user and the one or more processed predictions of the plurality of processed predictions, wherein a command comprises at least one user input mapped to at least one mapped task associated with a mapped device and to be executed by the computing device;
executing, by the computing device, the at least one mapped task of the first command; and
causing, by the computing device, at least one corresponding action at the mapped device associated with the one or more mapped tasks of the first command
wherein a correction score is calculated according to:

$$\frac{RW - D}{LW - D} + \frac{T}{F} \geq H$$

wherein RW represents a weight of the relative word or phrase,
LW represents a weight of the word or phrase of the at least one prediction,
D represents a phonetic distance between the relative word and the word or phrase of the at least one prediction,
F represents a total number of times the word or phrase of the at least one prediction has been detected in previous iterations of post processing,
T represents a number of transitions made from the word or phrase of the at least one prediction to the relative word or phrase, and
H represents the threshold correction value.

2. The method of claim 1, wherein isolating the speech of the user from the audio data comprises:
  identifying, by the computing device, a plurality of characteristics of the audio data, wherein characteristics of the audio data comprise at least one of volume, clarity, and consistency; and
  comparing, by the computing device, a characteristic of the plurality of characteristics to one or more other characteristics of the plurality of characteristics of the audio data.

3. The method of claim 1, wherein the word-phrase graph comprises:
  a plurality of word-phrase nodes corresponding to each relative word or phrase of the one or more relative words or phrases, wherein each word-phrase node comprises:
    a phonetic representation of the corresponding relative word or phrase;
    one or more phonetic components of the corresponding relative word or phrase;
    a syllable count of the corresponding relative word or phrase;
    a weighting value;
    a session frequency reflecting a number of times the corresponding relative word or phrase has been detected in a particular session;
    a total frequency reflecting a number of times the corresponding relative word or phrase has been detected in previous iterations of the post processing; and
    an average frequency reflecting an average number of times the corresponding relative word or phrase is detected in the particular session; and
  a plurality of edges connecting pairs of word-phrase nodes of the plurality of word-phrase nodes, wherein each edge of the plurality of edges comprises:
    a number of phonetic parts shared by each word-phrase node of the pair of word-phrase nodes connected by each edge, and
    a number of transitions.

4. The method of claim 1, wherein performing the post processing further comprises:
  determining, by the computing device, that at least one prediction of the one or more predictions begins with a dictation phrase; and
  detecting, by the computing device, a second command corresponding to the dictation phrase.

5. The method of claim 1, wherein selecting the command comprises:
  applying, by the computing device and to each processed prediction, one of:
    a start-of-chain with removal mode,
    a mid-chain with removal mode, and
    a mid-chain with no removal mode.

6. The method of claim 1, wherein executing the one or more mapped tasks of the first command comprises:
  storing, by the computing device, the one or more mapped tasks of the first command in a Human Interface Device (HID) state and a HID queue, wherein the HID state comprises one or more mapped tasks being executed by the computing device, and wherein the HID queue comprises one or more mapped tasks to be executed by the computing device after the one or more mapped tasks in the HID state are executed;
  storing, by the computing device, one or more HID packets in a HID report after executing a mapped task of the one or more mapped tasks of the first command; and
  communicating, by the computing device, the HID report to the mapped device.

7. The method of claim 1, wherein executing one or more mapped tasks of the first command comprises executing, by the computing device, a remote task of a third-party system, wherein executing a remote task at a third-party system comprises:
  identifying, by the computing device, one or more remote task access tokens associated with the first command;
  communicating, by the computing device, a remote task request and the remote task access token to the third-party system; and
  receiving, by the computing device, access to the third-party system.

8. The method of claim 7, wherein the mapped device is associated with the third-party system.

9. One or more non-transitory computer readable media comprising instructions that, when executed by a computing system, cause the computing system to:
  receive audio data, wherein the audio data comprises speech of a user and other audio;

isolate the speech of the user from the audio data;
identify at least one of one or more vowel sounds and a diphthong in the isolated speech of the user;
analyze the isolated speech of the user and generate a plurality of predictions, wherein each prediction of the plurality of predictions comprises at least one of a word and a phrase in the isolated speech of the user;
perform a post processing on the plurality of predictions and generate a plurality of processed predictions based on the plurality of predictions, wherein the instructions that, when executed by the computing system, cause the computing system to perform the post processing on the plurality of predictions and generate the processed prediction comprise instructions that cause the computing system to:
compare the at least one word and phrase of the plurality of predictions to one or more relative words and phrases in a word-phrase graph;
calculate a correction score for at least one prediction of the plurality of predictions and at least one relative word and phrase of the one or more relative words and phrases;
determine whether the correction score exceeds a threshold correction score; and
generating a processed prediction,
wherein the processed prediction comprises the at least one relative word and phrase used to calculate the correction score if the correction score exceeds the threshold correction score, and
wherein the processed prediction comprises the at least one at least one prediction used to calculate the correction score if the correction score does not exceed the threshold correction score;
select a first command in a command profile, the first command defining a user input comprising at least one of the one or more vowel sounds and the diphthong identified in the isolated speech of the user and the one or more processed predictions of the plurality of processed predictions, wherein a command comprises a user input mapped to at least one mapped task associated with a mapped device;
execute the at least one mapped task of the first command; and
cause at least one corresponding action at the mapped device associated with the at least one mapped tasks of the first command,
wherein the word-phrase graph comprises:
a plurality of word-phrase nodes corresponding to each relative word or phrase of the one or more relative words or phrases, wherein each word-phrase node comprises:
a phonetic representation of the corresponding relative word or phrase;
one or more phonetic components of the corresponding relative word or phrase;
a syllable count of the corresponding relative word or phrase;
a weighting value;
a session frequency reflecting a number of times the corresponding relative word or phrase has been detected in a particular session;
a total frequency reflecting a number of times the corresponding relative word or phrase has been detected in previous interactions of the post processing; and
an average frequency reflecting an average number of times the corresponding relative word or phrase is detected in the particular session; and
a plurality of edges connecting pairs of word-phrase nodes of the plurality of word-phrase nodes, wherein each edge of the plurality of edges comprises:
a number of phonetic parts shared by a pair of each word-phrase node of the pair of word-phrase nodes connected by each edge, and a number of transitions.

10. The one or more non-transitory media of claim 9, wherein the instructions that, when executed by the computing system, cause the computing system to isolate the speech of the user comprises instructions that cause the computing system to:
identify a plurality of characteristics of the audio data, wherein characteristics of the audio data comprise at least one of volume, clarity, and consistency; and
compare a characteristic of the plurality of characteristics to one or more other characteristics of the plurality of characteristics of the audio data.

11. The one or more non-transitory media of claim 9, wherein the correction score is calculated according to:

$$\frac{RW-D}{LW-D} + \frac{T}{F} \geq H$$

wherein RW represents a weight of the relative word or phrase,
LW represents a weight of the word or phrase of the at least one prediction,
D represents a phonetic distance between the relative word and the word or phrase of the at least one prediction,
F represents a total number of times the word or phrase of the at least one prediction has been detected in previous iterations of the post processing,
T represents a number of transitions made from the word or phrase of the at least one prediction to the relative word or phrase, and
H represents the threshold correction score.

12. The one or more non-transitory media of claim 9, wherein the instructions that, when executed by the computing system, cause the computing system to perform a post processing further comprise instructions that cause the computing system to:
determine that the at least one prediction of the one or more predictions begins with a dictation phrase; and
detect a second command corresponding to the dictation phrase.

13. The one or more non-transitory media of claim 9, wherein instructions that, when executed by the computing system, cause the computing system to select a command comprise instructions that cause the computing system to:
apply, to each processed prediction, one of:
a start-of-chain with removal mode, a mid-chain with removal mode, or a mid-chain with no removal mode.

14. The one or more non-transitory media of claim 9, wherein instructions that, when executed by the computing system, cause the computing system to execute one or more mapped tasks of the first command comprises instructions that cause the computing system to execute a remote task of a third-party system, wherein instructions that cause the computing system to execute a remote task at a third-party system comprise instructions to:

identify one or more remote task access tokens associated with the first command;
communicate a remote task request and the remote task access token to the third-party system; and
receive access to the third-party system.

15. A system comprising:
one or more processors; and
at least one memory operatively coupled to the processor and storing instructions that, when executed by at least one processor of the one or more processors, cause the system to:
  receive audio data, wherein the audio data comprises speech of a user and other audio;
  isolate the speech of the user from the audio data;
  identify at least one of one or more vowel sounds and a diphthong in the isolated speech of the user;
  analyze the isolated speech of the user and generate a plurality of predictions, wherein each prediction of the plurality of predictions comprises at least one of a word and a phrase in the isolated speech of the user;
  perform a post processing on the plurality of predictions and generate a plurality of processed predictions based on the plurality of predictions;
  calculate a correction score for at least one prediction of the plurality of predictions and at least one relative word and phrase of the one or more relative words and phrases;
  select a first command in a command profile, the first command defining a user input comprising at least one of the one or more vowel sounds and the diphthong identified in the isolated speech of the user and the one or more processed predictions of the plurality of processed predictions, wherein a command comprises a user input mapped to at least one mapped task associated with a mapped device;
  execute the at least one mapped task of the first command; and
  cause at least one corresponding action at the mapped device associated with the at least one mapped tasks of the first command,
wherein the correction score is calculated according to:

$$\frac{RW - D}{LW - D} + \frac{T}{F} \geq H$$

wherein RW represents a weight of the relative word or phrase,
LW represents a weight of the word or phrase of the at least one prediction,
D represents a phonetic distance between the relative word and the word or phrase of the at least one prediction,
F represents a total number of times the word or phrase of the at least one prediction has been detected in previous iterations of the post processing,
T represents a number of transitions made from the word or phrase of the at least one prediction to the relative word or phrase, and
H represents the threshold correction score.

16. The system of claim 15, wherein instructions that, when executed by at least one processor of the one or more processors, cause the system to execute one or more mapped tasks of the first command comprise instructions that cause the at least one processor to execute a remote task of a third-party system, wherein instructions that cause the at least one processor to execute a remote task at a third-party system comprise instructions to:
  identify one or more remote task access tokens associated with the first command;
  communicate a remote task request and the remote task access token to the third-party system; and
  receive access to the third-party system.

* * * * *